Sept. 7, 1948. R. R. SCHUTZ 2,448,630
FRUIT PICKING TOWER
Filed Sept. 3, 1946 2 Sheets—Sheet 2
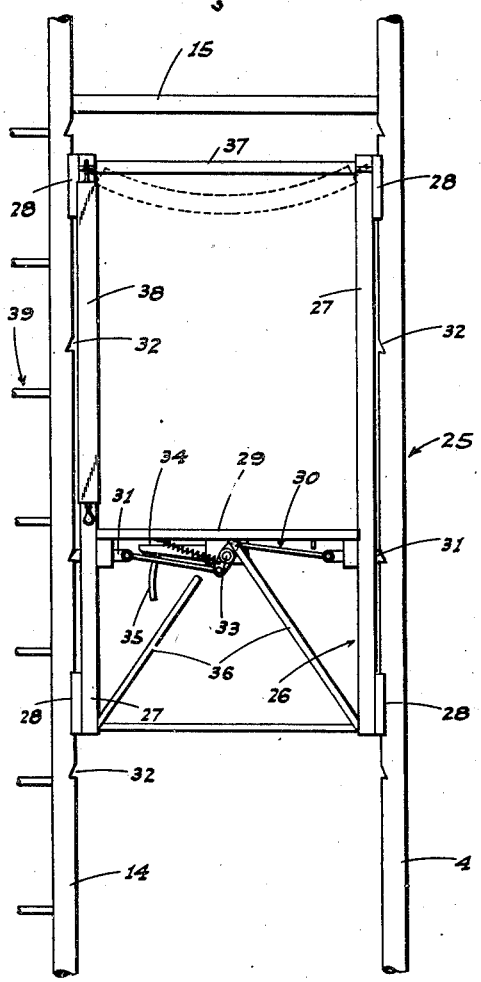
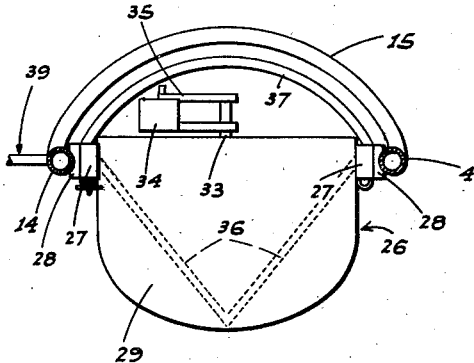
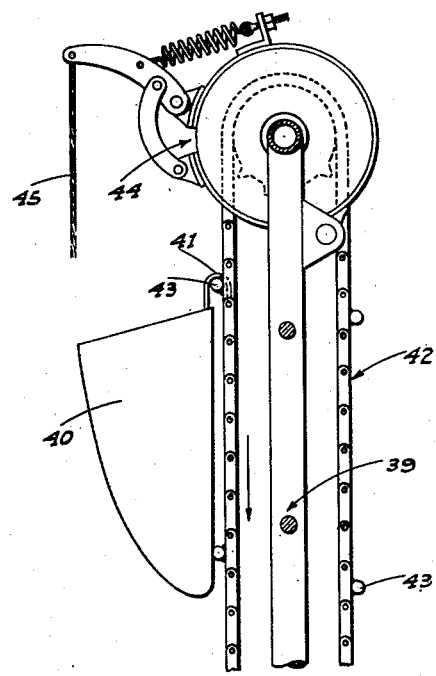
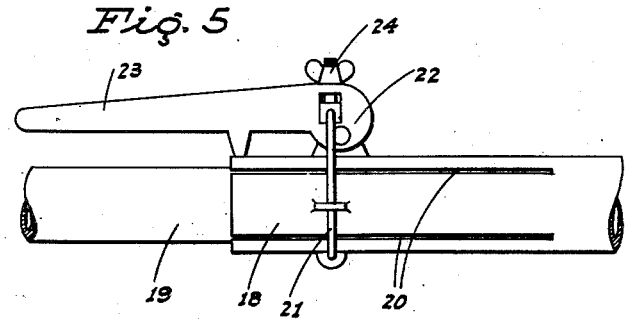
INVENTOR.
Robert R. Schutz
BY
ATTYS Patented Sept. 7, 1948

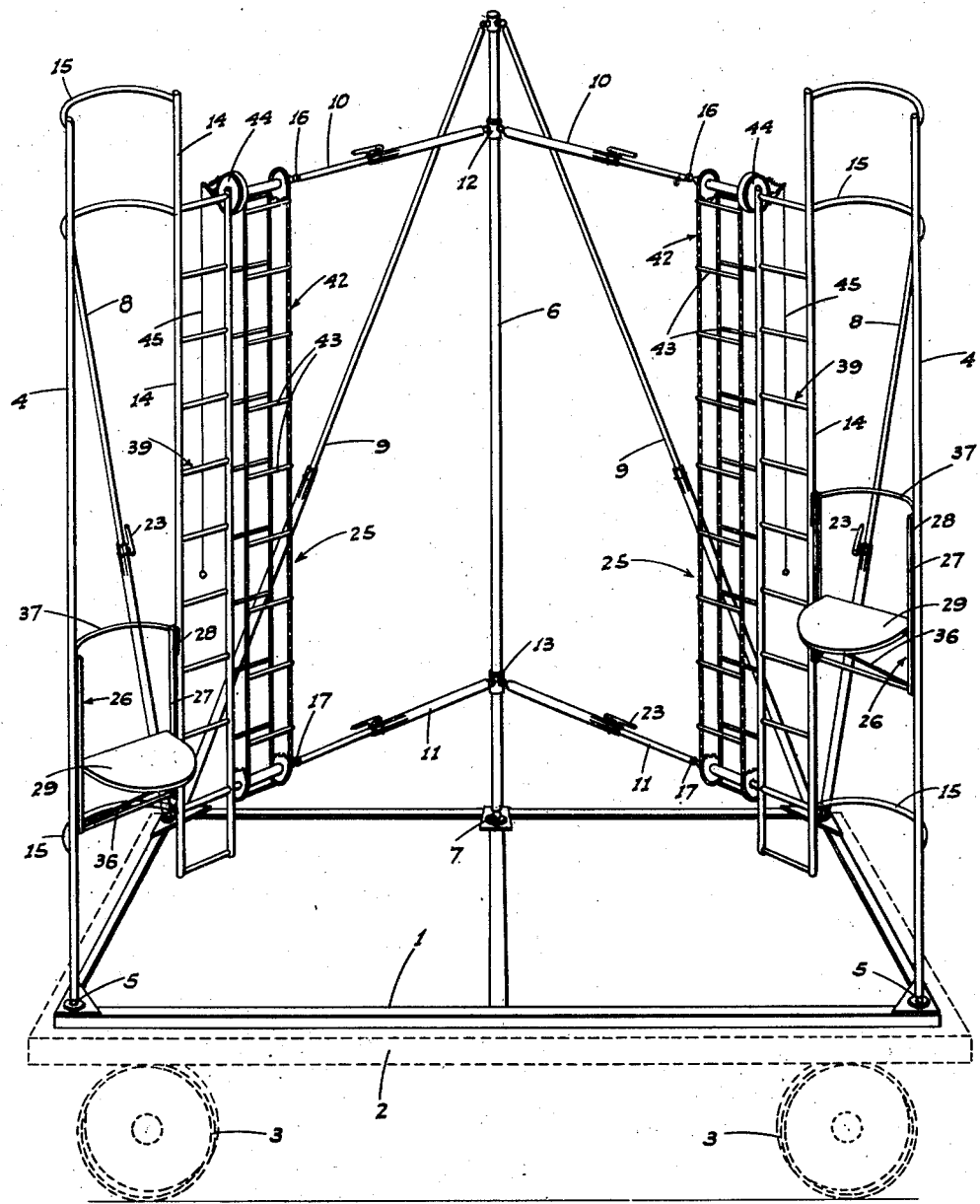

2,448,630

UNITED STATES PATENT OFFICE 2,448,630

FRUIT PICKING TOWER

Robert R. Schutz, Roseville, Calif.

Application September 3, 1946, Serial No. 694,523

9 Claims. (Cl. 304—9)

This invention relates to, and it is an object to provide, a portable fruit picking tower for use in orchards to facilitate harvesting of fruit crops.

Another object of the invention is to provide a portable fruit picking tower which includes an upstanding skeleton frame having platform assemblies thereon to support workers at adjustable height, and from which platform assemblies fruit is within easy reach for picking.

A further object of the invention is to provide for the adjustment of the upstanding frame to vertical so as to compensate for ground slope, as when the tower is used in hilly areas where the supporting vehicle bed may not be horizontal.

Another object of the invention is to provide a portable fruit picking tower having a novel conveyor unit associated with the tower, near each platform, for the purpose of lowering loaded fruit picking bags to a point readily accessible from the ground.

A further object of the invention is to provide a practical fruit picking tower, and yet one which will be exceedingly effective for the purpose for which it is designed.

These objects are accomplished by means of such structure and relative arrangement of parts as will fully appear by a perusal of the following specification and claims.

In the drawings:

Figure 1 is a front elevation of the tower as mounted on a vehicle.

Figure 2 is an enlarged fragmentary elevation of one of the platform assemblies.

Figure 3 is a sectional plan of one of said platform assemblies taken directly above the platform.

Figure 4 is an enlarged fragmentary sectional elevation of one of the bag lowering conveyors, showing particularly the brake unit arranged therewith.

Figure 5 is an enlarged fragmentary elevation showing one of the adjusting devices as used in the braces and tie rods of the frame.

Referring now more particularly to the characters of reference on the drawings, the fruit picking tower comprises an open rectangular base frame 1 adapted to be fixed on the bed 2 of any suitable vehicle which includes supporting wheels 3 whereby the tower may be moved from tree to tree in an orchard.

An upstanding frame is mounted in connection with the base frame 1 and comprises a pair of front corner posts 4, each swively mounted, as at 5, in connection with the front corners of the base frame 1. A rear central post 6 upstands from the base frame 1 at the back centrally of its ends, and is likewise swively mounted to said base frame, as at 7. Diagonal, extensible braces 8 connect between the front corner posts 4 adjacent their upper ends, and corresponding rear corners of the base frame 1, while other diagonal extensible braces 9 connect between the top of the rear central post 6 and said rear corners of the base frame. The braces 8 and 9 are swively mounted at the ends, as shown.

Upper and lower extensible tie rods, indicated at 10 and 11, connect between collars 12 and 13, respectively, on the rear central post, and thence extend forwardly in diverging relation to adjacent but short of corresponding front corner posts 4. At their forward ends the tie rods 10 and 11 are each fixed in connection with an upstanding, intermediate post 14, which in turn is fixed in connection with the adjacent front corner post by vertically spaced, backwardly curved connecting rods 15. The upper and lower tie rods 10 and 11 are swively connected to the collars 12 and 13, and intermediate their ends include other swivel connections 16 and 17, respectively. Outwardly of the swivel connections 16 and 17, the rods 10 and 11 are rigid with the corresponding intermediate post 14 for the support of certain parts of the structure, as will hereinafter appear.

By reason of the swivel arrangement of the several parts of the above described upstanding frame, and the extensibility of the described diagonal braces and tie rods, the entire upstanding frame may be adjusted to vertical, whereby to compensate for any inclination of the vehicle bed 2 which may result from use of the tower on uneven or hilly ground.

Also, the adjustments allow the frames to hug each individual tree being picked, while enabling the same to be readily moved back into the central space between a row of trees, for movement of the apparatus from one tree to the next, without knocking any fruit from such tree.

Each of the diagonal braces and tie rods includes an adjusting device, as shown in detail in Fig. 5, and which comprises the following:

Intermediate its ends each brace or rod includes tubular sections, indicated at 18 and 19, the section 19 telescoping into the section 18 and the latter being split a circumferentially spaced points, as at 20. A clamping yoke 21 surrounds the split tubular section 18 and connects to a pivotally mounted eccentric head 22 which includes a handle 23. In one position of the handle 23 the yoke 21 is released so that tubular sections 18 and 19 may be adjusted lengthwise. In another position of said handle the eccentric head 23 exerts tension on the yoke 21 which clamps the sections 18 and 19 against relative longitudinal adjustment. A wing nut 24 is arranged for the adjustment of the clamping yoke 21.

The several adjusting devices as used in the respective diagonal braces and tie rods are clearly shown in Fig. 1.

The upstanding frame includes, on opposite sides and ahead of the rear central post 6, i. e. between said rear central post and each of the front corner posts 4, a novel platform, ladder, and conveyor unit, as shown generally at 25, and as each is identical a description of one will suffice for both.

The front corner post 4 and the adjacent intermediate post 14 of each unit 25 form a guideway for a vertically movable carriage, indicated generally at 26. The carriage 26 includes a generally rectangular frame structure having side bars 27 including shoes 28 which run in guided relation on the posts 4 and 14. The carriage 26 includes, adjacent but short of its lower end, a forwardly projecting platform 29.

The carriage 26 is maintained in any selective position of vertical adjustment by means of an opposed throw latch unit 30 having spring advanced dogs 31 which releasably engage in notches 32 in the posts 4 and 14. The latch unit 30 includes a center shaft 33 operable by a foot pedal 34 or a hand trigger 35. By operating either the pedal 34 or the trigger 35, the latch unit 30 can be released for downward adjustment of the carriage 26. Upward movement of the carriage 26 is effected by merely pushing or pulling up on the same, since dogs 31 are self-releasing, due to the V form of notches 32. Since the platform extends forwardly from carriage rails 27, rigidity of said platform is assured by diagonal braces 36 between the bars 27 at their lower end and the under side of the carriage at the front.

Above the platform 29 each carriage may include a backwardly curved guard rail 37 which prevents a worker on the platform 29 from falling backwards. Forward falling from the platform is prevented by a safety belt 38 adapted to connect between the upper ends of the side bars 27 and about the picker.

When the fruit picking tower is in use, it is positioned adjacent a tree, and the carriage 26 is adjusted vertically to any selective position, whereupon a worker ascends to the platform 29 by means of a ladder 39 formed alongside the intermediate post 14 between the rigid portions of the upper and lower tie rods 10 and 11. From such platform 29 the worker can easily reach forward to pick fruit from the tree adjacent which the tower is disposed. The vehicle is set adjacent the tree so that the curvature of the tree extends into the tower in overhanging relation to the base frame 1, and generally between the units 25.

The fruit is picked into an open topped bag, one of which is indicated at 40, and which includes transversely spaced top hooks 41. When each bag 40 is filled by a worker, such loaded bag is lowered from adjacent the worker, i. e. at an elevated point, downwardly to adjacent the vehicle bed 2 by means of the following described conveyor:

An endless chain conveyor, indicated at 42, extends between the upper and lower tie rods 10 and 11 adjacent the ladder 39, said conveyor including a plurality of cross rods 43. As each bag 40 is loaded the worker engages the top hooks 41 on one of the cross rods 43 on the side or reach of the conveyor 42 which is intended to move downwardly. Downward movement of said reach results of course by gravity under the influence of the weight of the loaded bag, and such downward movement is controlled by a brake unit associated with the conveyor at the top, and indicated generally at 44. Such brake unit includes a pull cord 45 which depends downwardly a distance sufficient that it may be reached by a person from the ground or from the bed 2. A pull on the cord 45 releases the brake unit 44, whereby the conveyor 42 may permit of controlled lowering of loaded fruit picking bags 40. A worker on the ground or on the vehicle bed 2 removes the loaded bags from the conveyor 42 adjacent its lower ends, empties such bags and then hangs the empty, and relatively light weight, bags on the upwardly moving reach of the conveyor for redelivery to the worker.

The above described fruit picking tower provides a practical and effective device for the harvesting of fruit, materially facilitating and expediting the operation. The structure is relatively simple in its construction, and as it involves a minimum of parts requires little maintenance or repair.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention as defined by the appended claims.

Having thus described the invention, the following is claimed as new and useful and upon which Letters Patent is desired:

1. A fruit picking tower comprising a substantially rectangular base, front corner posts upstanding from the base, a central rear post upstanding from the base, diagonal braces extending from the front corner posts to the rear corners of the base, other diagonal braces extending from the central rear post to said rear corners of the base, frame means connecting between each of the front corner posts and central rear post, and a vertically adjustable platform carried by each of said frame means.

2. A fruit picking tower comprising a substantially rectangular base, front corner posts upstanding from the base, a central rear post upstanding from the base, diagonal braces extending from the front corner posts to the rear corners of the base, other diagonal braces extending from the central rear post to said rear corners of the base, frame means connecting between each of the front corner posts and central rear post, and a vertically adjustable platform carried by each of said frame means; there being a bag lowering conveyor supported by the frame means adjacent the path of vertical adjustment of the platform.

3. A fruit picking tower comprising a substantially rectangular base, front corner posts upstanding from the base, a central rear post upstanding from the base, diagonal braces extending from the front corner posts to the rear corners of the base, other diagonal braces extending from the central rear post to said rear corners of the base, frame means connecting between each of the front corner posts and central rear post, each of said frame means including upper and lower tie rods, and a vertically adjustable platform carried by each of said frame means.

4. A fruit picking tower comprising a substantially rectangular base, front corner posts upstanding from the base, a central rear post upstanding from the base, diagonal braces extending from the front corner posts to the rear corners of the base, other diagonal braces extending from the central rear post to said rear corners of the base, frame means connecting between each of the front corner posts and central rear post, each of said frame means including upper and lower tie rods, and a vertically adjustable platform carried by each of said frame means; the posts being swivelly mounted on the base, and said braces and tie rods being extensible and swivelly connected relative to said posts.

5. A fruit picking tower comprising a base, a pair of spaced posts upstanding from the base, upper and lower tie rods connected to one post and projecting toward but terminating short of the other post, an intermediate post fixed to the terminations of the tie rods in spaced parallel relation to said other post, vertically spaced, outwardly deformed rods connecting the intermediate post and said other post, a carriage vertically adjustably mounted between the intermediate post and said other post, and a platform on the carriage.

6. A fruit picking tower comprising a base, a pair of spaced posts upstanding from the base, upper and lower tie rods connected to one post and projecting toward but terminating short of the other post, an intermediate post fixed to the terminations of the tie rods in spaced parallel relation to said other post, vertically spaced, outwardly deformed rods connecting the intermediate post and said other post, a carriage vertically adjustably mounted between the intermediate post and said other post, and a platform on the carriage; there being a ladder extending between the tie rods adjacent said intermediate post.

7. A fruit picking tower comprising a base, a pair of spaced posts upstanding from the base, upper and lower tie rods connected to one post and projecting toward but terminating short of the other post, an intermediate post fixed to the terminations of the tie rods in spaced parallel relation to said other post, vertically spaced, outwardly deformed rods connecting the intermediate post and said other post, a carriage vertically adjustably mounted between the intermediate post and said other post, and a platform on the carriage; there being a bag lowering conveyor mounted in connection with and extending between the tie rods adjacent said intermediate post.

8. A fruit picking tower comprising a base, a pair of spaced posts upstanding from the base, upper and lower tie rods connected to one post and projecting toward but terminating short of the other post, an intermediate post fixed to the terminations of the tie rods in spaced parallel relation to said other post, vertically spaced, outwardly deformed rods connecting the intermediate post and said other post, a carriage vertically adjustably mounted between the intermediate post and said other post, and a platform on the carriage; there being a back lowering conveyor mounted in connection with and extending between the tie rods adjacent said intermediate post, said conveyor being endless, and a manually releasable brake associated with the conveyor to control its motion.

9. A fruit picking tower comprising a base, a pair of spaced posts upstanding from the base, upper and lower tie rods connected to one post and projecting toward but terminating short of the other post, an intermediate post fixed to the terminations of the tie rods in spaced parallel relation to said other post, vertically spaced, outwardly deformed rods connecting the intermediate post and said other post, a carriage vertically adjustably mounted between the intermediate post and said other post, and a platform on the carriage; there being a ladder extending between the tie rods adjacent said intermediate post, and a bag lowering conveyor mounted in connection with and extending between the tie rods alongside the ladder.

ROBERT R. SCHUTZ.

REFERENCES CITED

The following references are of record in the file of this patent:

UNITED STATES PATENTS

| Number | Name | Date |
| --- | --- | --- |
| 463,178 | Vanderburg | Nov. 17, 1891 |
| 509,007 | Wadsworth | Nov. 21, 1893 |
| 530,389 | Brooks | Dec. 4, 1894 |
| 826,041 | Bryant et al. | July 17, 1906 |
| 1,362,944 | Kirby | Dec. 21, 1920 |
| 1,458,313 | Sergeant | June 12, 1923 |
| 2,245,661 | Fieroh | June 17, 1941 |
| 2,405,453 | Savage | Aug. 6, 1946 |
| 2,410,030 | Horni | Oct. 29, 1946 |